US009647456B2

United States Patent
Nair

(10) Patent No.: US 9,647,456 B2
(45) Date of Patent: May 9, 2017

(54) POWER MANAGEMENT CIRCUIT AND A METHOD FOR OPERATING A POWER MANAGEMENT CIRCUIT

(71) Applicant: NXP B.V., Eindhoven (NL)

(72) Inventor: Mukesh Balachandran Nair, Overijse (BE)

(73) Assignee: NXP B.V., Eindhoven (NL)

( * ) Notice: Subject to any disclaimer, the term of this patent is extended or adjusted under 35 U.S.C. 154(b) by 511 days.

(21) Appl. No.: 14/210,096

(22) Filed: Mar. 13, 2014

(65) Prior Publication Data

US 2015/0263520 A1   Sep. 17, 2015

(51) Int. Cl.
| | |
|---|---|
| H02J 3/46 | (2006.01) |
| H02J 3/02 | (2006.01) |
| H02J 3/38 | (2006.01) |
| H02J 9/06 | (2006.01) |
| H02J 1/02 | (2006.01) |
| H02J 1/04 | (2006.01) |
| H02J 3/01 | (2006.01) |
| H02J 3/10 | (2006.01) |

(52) U.S. Cl.
CPC ........... *H02J 3/02* (2013.01); *H02J 1/02* (2013.01); *H02J 1/04* (2013.01); *H02J 3/01* (2013.01); *H02J 3/10* (2013.01); *H02J 3/38* (2013.01); *H02J 3/46* (2013.01); *H02J 9/06* (2013.01); *Y10T 307/658* (2015.04)

(58) Field of Classification Search
CPC ..................................... H02J 3/38; H02J 3/46
See application file for complete search history.

(56) References Cited

U.S. PATENT DOCUMENTS

| | | | | |
|---|---|---|---|---|
| 5,187,396 A | * | 2/1993 | Armstrong, II | ...... H03K 5/2472 307/85 |
| 5,396,108 A | * | 3/1995 | McClure | .......... H03K 19/09429 307/412 |
| 6,493,257 B1 | * | 12/2002 | Coughlin, Jr. | .......... G11C 14/00 365/154 |
| 6,995,599 B2 | * | 2/2006 | Huang | ...................... H02J 1/10 327/408 |
| 8,497,604 B2 | * | 7/2013 | Seo | ........................ G06F 1/3231 307/116 |

(Continued)

FOREIGN PATENT DOCUMENTS

CN    102340169 A    2/2012

OTHER PUBLICATIONS

European Search Report, 15156391.3, Jul. 6, 2015.

*Primary Examiner* — Thienvu Tran
*Assistant Examiner* — Pinping Sun

(57) ABSTRACT

A power management circuit and a method for operating a power management circuit are described. In one embodiment, a power management circuit includes power switching modules. Power is supplied to each of the power switching modules by at least one of multiple power sources. Each of the power switching modules includes a latch circuit configured to have a definite state at power-up of a corresponding power source and a logic circuit configured to control power supplied from the corresponding power source in response to the definite state of the latch circuit, where the logic circuit includes a cross-coupled circuit. Other embodiments are also described.

17 Claims, 11 Drawing Sheets

(56) References Cited

U.S. PATENT DOCUMENTS

| | | | | |
|---|---|---|---|---|
| 8,656,193 B2* | 2/2014 | Hijazi | ..................... | G06F 1/263 |
| | | | | 713/300 |
| 9,041,256 B2* | 5/2015 | Huang | .................... | H02J 9/005 |
| | | | | 307/126 |
| 9,099,869 B2 | 8/2015 | Taurand et al. | | |
| 9,214,810 B2 | 12/2015 | Hauf et al. | | |
| 9,225,323 B1* | 12/2015 | Wang | .................. | G01R 19/175 |
| 2003/0080625 A1 | 5/2003 | Malik et al. | | |
| 2005/0146816 A1* | 7/2005 | Nguyen | .................... | G06F 1/26 |
| | | | | 361/18 |
| 2006/0075266 A1 | 4/2006 | Popescu-Stanesti et al. | | |
| 2006/0256590 A1* | 11/2006 | Yang | ...................... | H02H 7/122 |
| | | | | 363/56.11 |
| 2010/0231051 A1* | 9/2010 | Yarbrough | ............. | H03K 3/356 |
| | | | | 307/80 |
| 2010/0327813 A1* | 12/2010 | Bucur | ................... | H02J 7/0013 |
| | | | | 320/134 |
| 2012/0133397 A1 | 5/2012 | Draxelmayr et al. | | |
| 2014/0002134 A1* | 1/2014 | Ubaradka | ........ | H03K 3/356104 |
| | | | | 326/81 |

* cited by examiner

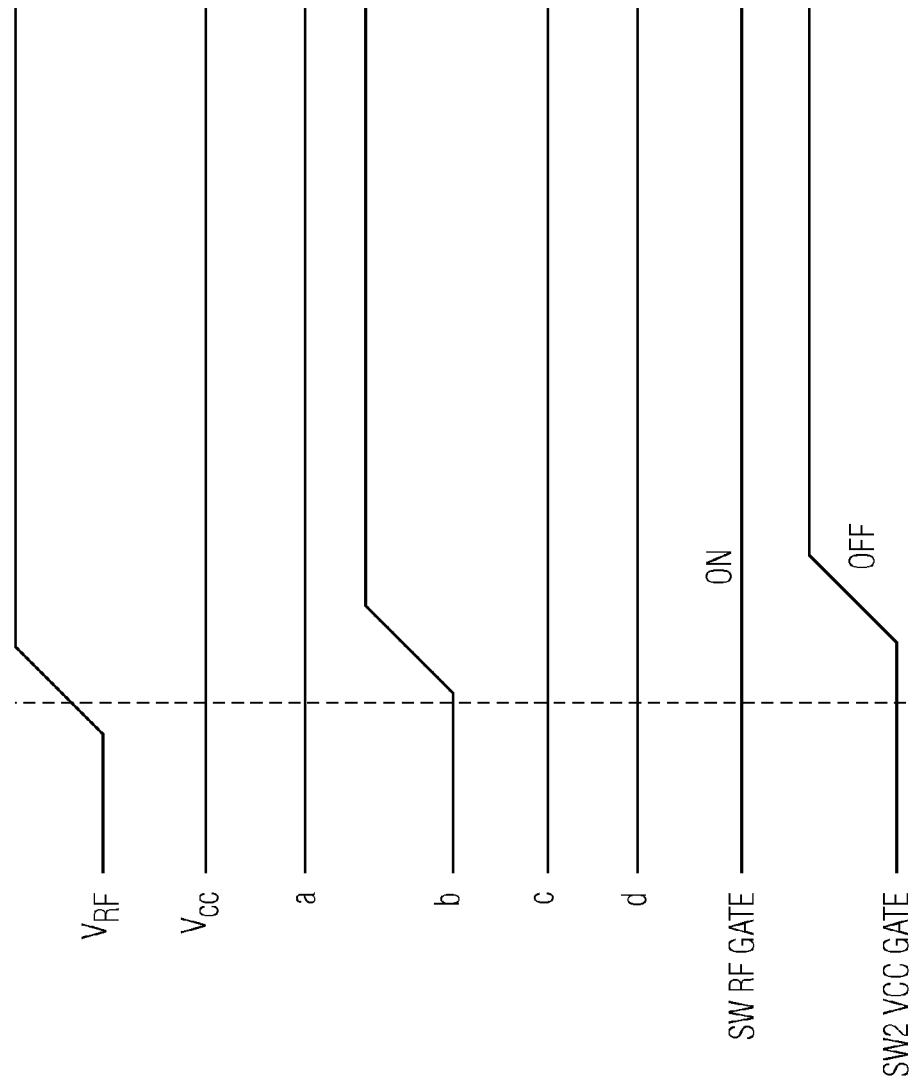

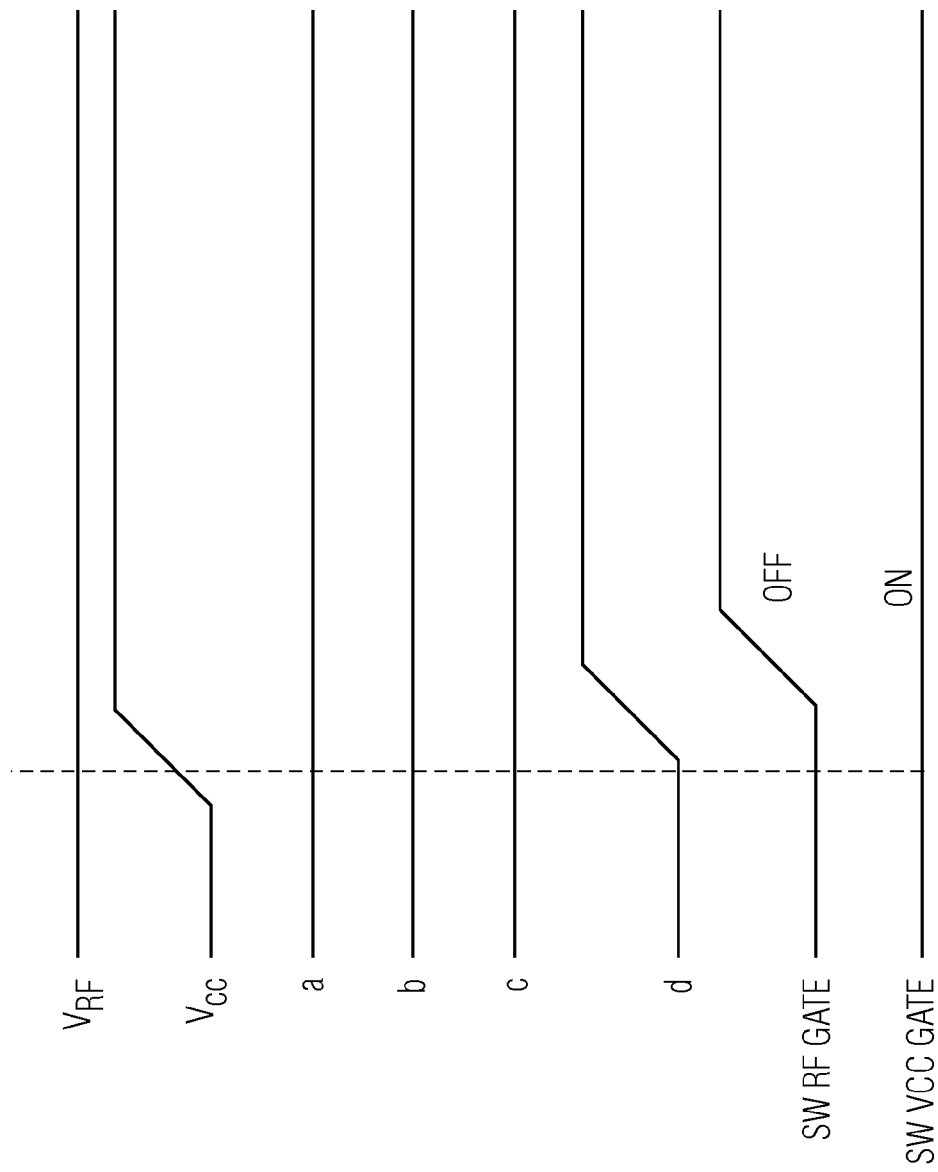

POWER MANAGEMENT CIRCUIT AND A METHOD FOR OPERATING A POWER MANAGEMENT CIRCUIT

Embodiments of the invention relate generally to electronic hardware and methods for operating electronic hardware, and, more particularly, to power management circuits and methods for operating power management circuits.

Some electronic devices are powered by multiple power sources. For example, a radio frequency identification (RFID) device may be powered wirelessly by an RF electromagnetic field and by a local power source such as a battery. Power management circuits are used to manage electronic devices that support multiple power sources. For example, a power management circuit is used to control power supplied to an electronic device based on the availability of power sources and to handle the transition between the power sources.

Conventional power management circuits for devices that support multiple power sources suffer from various drawbacks. For example, a conventional power management circuit typically cannot ensure a smooth transition of power from one power source to another power source without interrupting the power supplied to an onboard integrated circuit (IC) device. In addition, a conventional power management circuit can cause cross conduction between different power sources. Consequently, a conventional IC device that supports multiple power sources can have startup issues, which may cause a failure of the IC device. Therefore, there is a need for a power management circuit for multiple power sources that allows a smooth transition between different power sources and reduces cross conduction between the different power sources.

A power management circuit and a method for operating a power management circuit are described. In one embodiment, a power management circuit includes power switching modules. Power is supplied to each of the power switching modules by at least one of multiple power sources. Each of the power switching modules includes a latch circuit configured to have a definite state at power-up of a corresponding power source and a logic circuit configured to control power supplied from the corresponding power source in response to the definite state of the latch circuit, where the logic circuit includes a cross-coupled circuit. The latch circuit differs from a conventional latch at power-up in the sense that the power supply terminal itself acts as the input to the latch circuit and enables the latch circuit to be configured in a defined output state. Using a latch circuit having a definite state at the power-up of power source and a logic circuit with a cross-coupled circuit, the power management circuit is able to smoothly transition between different power sources and reduce cross conduction between the different power sources. Other embodiments are also described.

In an embodiment, a power management circuit includes power switching modules. Power is supplied to each of the power switching modules by at least one of multiple power sources. Each of the power switching modules includes a latch circuit configured to have a definite state at power-up of a corresponding power source and a logic circuit configured to control power supplied from the corresponding power source in response to the definite state of the latch circuit, where the logic circuit includes a cross-coupled circuit.

In an embodiment, a power management circuit includes a first power switching module and a second power switching module. Power is supplied to the first power switching module by a wireless power source. Power is supplied to the second power switching module by a battery power source. Each of the first and second power switching modules includes a back-to-back inverter latch circuit configured to have a definite state at power-up of a corresponding power source and a logic circuit configured to control power supplied from the corresponding power source in response to the definite state of the back-to-back inverter latch circuit. The logic circuit includes a cross-coupled circuit and a switch circuit connected to the corresponding power source.

In an embodiment, a method for operating a power management circuit involves providing power switching modules, where power is supplied to each of the power switching modules by at least one of multiple power sources, operating a latch circuit of each of the power switching modules to have a definite state at power-up of a corresponding power source, preventing cross conduction between the power sources using a logic circuit of each of the power switching modules, and connecting one of the power sources to an output of the power management circuit based on the definite states of the latch circuits.

Other aspects and advantages of embodiments of the present invention will become apparent from the following detailed description, taken in conjunction with the accompanying drawings, depicted by way of example of the principles of the invention.

FIG. 4 depicts a signal diagram of the power management circuit depicted in FIG. 2 in a power-up sequence where the wireless power source is present and the battery power source is absent.

FIG. 5 depicts a signal diagram of the power management circuit depicted in FIG. 2 in a power-up sequence where the battery power source is present and the wireless power source is absent.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
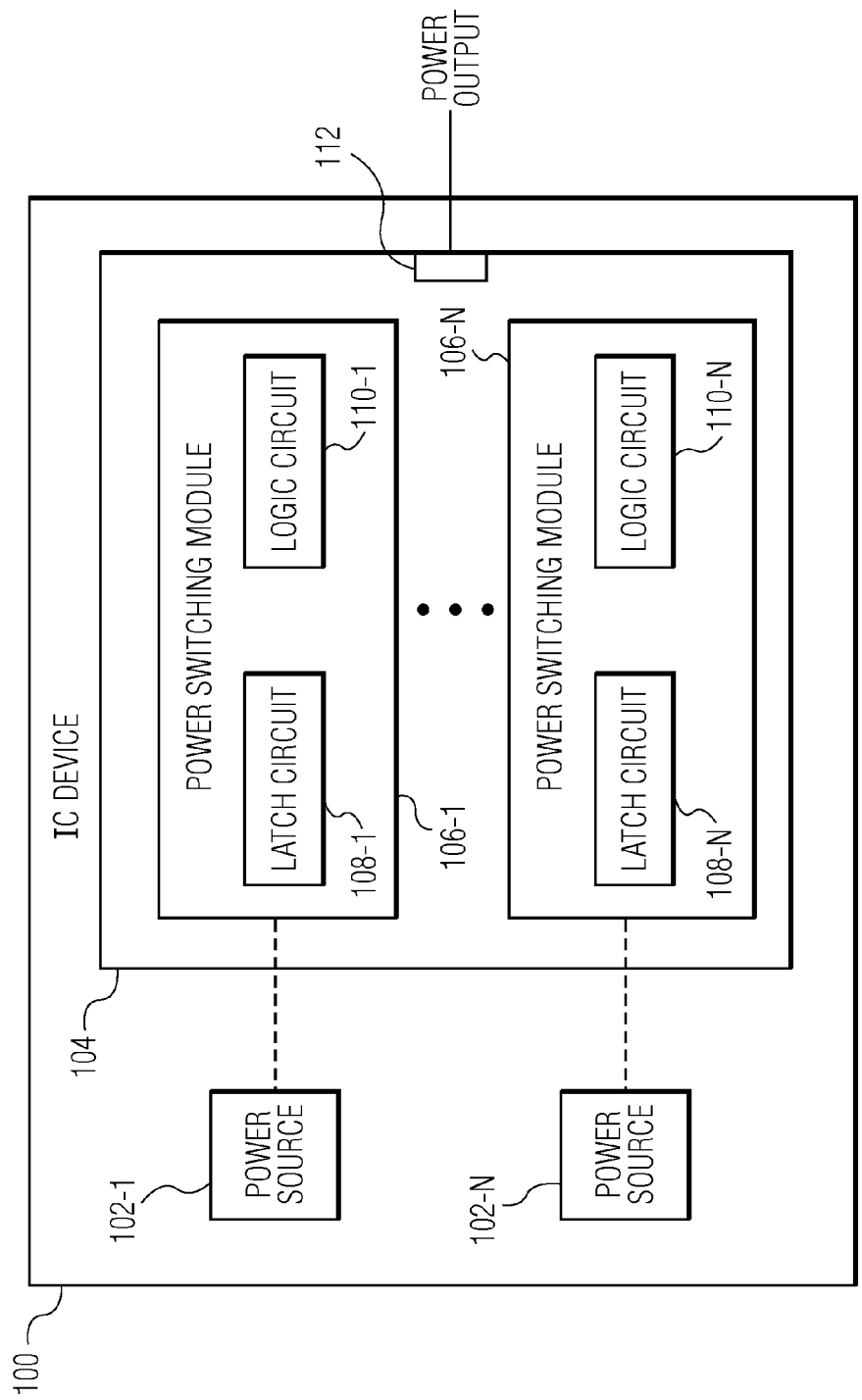
FIG. 1 is a schematic block diagram of an IC device in accordance with an embodiment of the invention.

FIG. 1 is a schematic block diagram of an IC device 100 in accordance with an embodiment of the invention. The IC device can be used in various applications, such as communications applications, industrial applications, medical applications, computer applications, automotive applications, and/or consumer or appliance applications. The IC device can be implemented in a substrate, such as a semiconductor wafer or a printed circuit board (PCB). In an embodiment, the IC device is packaged as a semiconductor IC chip. In some embodiments, the IC device is included in a computing device, such as a smartphone, a tablet computer, a laptop, etc. The IC device may be an RFID device that is powered wirelessly by RF electromagnetic signals and by a local power source such as a battery. For example, the IC device may be included in a Near Field Communications (NFC) capable computing device.

In the embodiment depicted in FIG. 1, the IC device 100 includes power sources/supplies 102-1, . . . , 102-N, where N is an integer that is larger than 1, and a power management circuit 104. The power sources 102-1, . . . , 102-N of the IC device may include any type of power supplies. In some embodiments, the power sources include at least one contactless power source. For example, the power management circuit may include an inducer that can be charged wirelessly by electromagnetic signals. In some embodiments, the power sources include at least one battery power source. For example, the power sources may include a lithium battery and/or any other type of battery.

The power management circuit 104 is configured to manage the power sources 102-1, . . . , 102-N. In an embodiment, the power management circuit is configured to control power supplied to the IC device based on the availability of the power sources and to handle the transition between the power sources based on predefined precedence. In the embodiment depicted in FIG. 1, the power management circuit includes a number of power switching modules 106-1, . . . , 106-N. Each of the power switching modules is supplied by a corresponding one of the power sources. Each of the power switching modules includes a latch circuit 108-1, . . . , or 108-N configured to have a definite state at power-up of a corresponding power source and a logic circuit 110-1, . . . , or 110-N configured to control power supplied from the corresponding power source in response to the definite state of the latch circuit. In an embodiment, the logic circuit is configured to connect the corresponding power source to an output terminal 112 of the power management circuit or to disconnect the corresponding power source from the output terminal of the power management circuit based on the state of the latch circuit. Using the latch circuit having a definite state at the power-up of power source and the logic circuit with the cross-coupled circuit, the power management circuit allows for smooth transition between different power sources and reduces cross conduction between different power sources.

Although the IC device 100 is depicted and described with certain components and functionality, other embodiments of the IC device may include fewer or more components to implement less or more functionality. For example, the IC device may include one or more power interfaces between the power sources and the power management circuit. In some embodiment, one or more power sources is not part of (e.g., external to) the IC device. In an embodiment, the IC device includes a local power source (e.g., a battery power source) and the power management circuit 104. In this embodiment, a remote power source (e.g., a contactless/wireless power source) is not included in the IC device.

Figure 2:
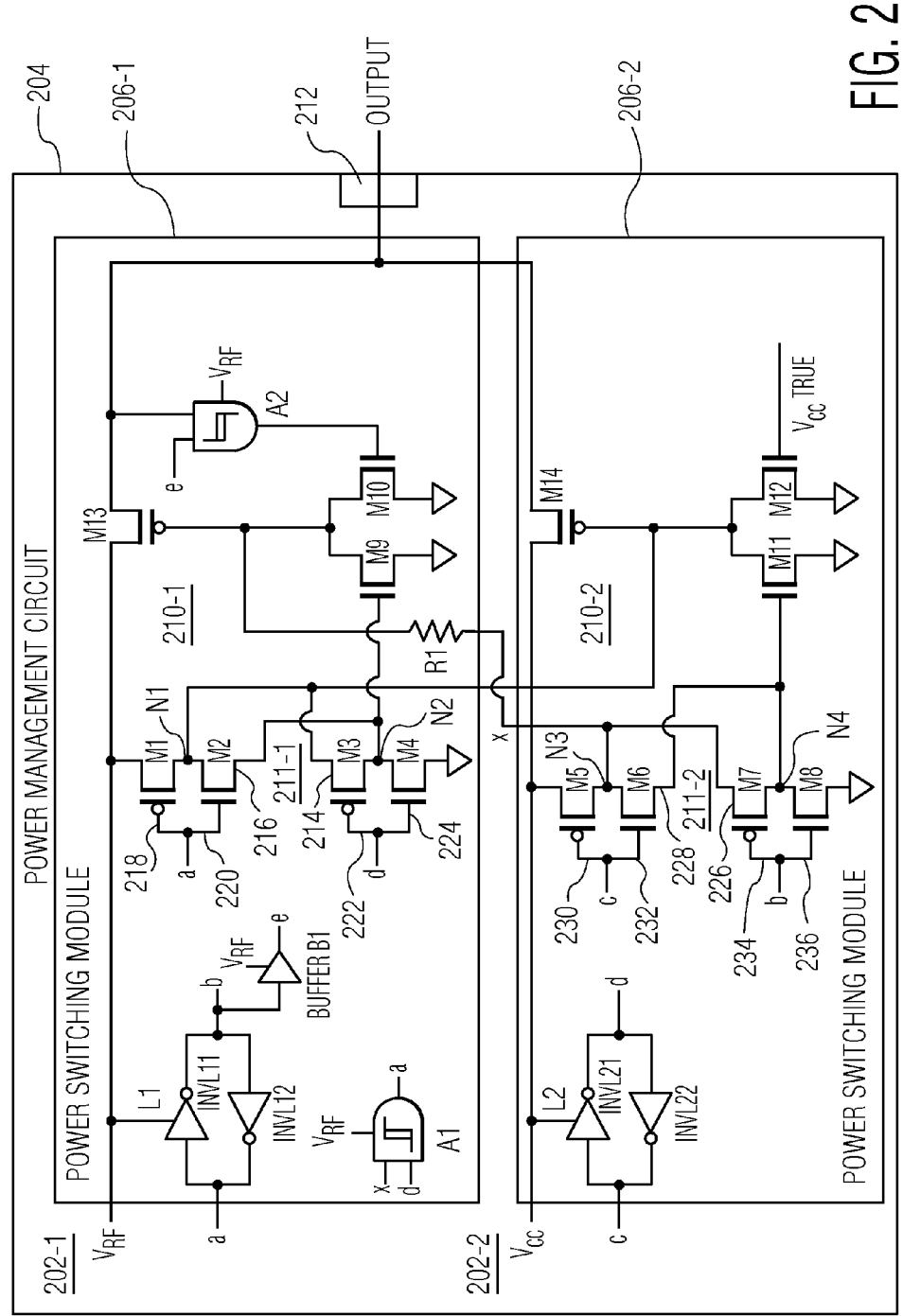
FIG. 2 depicts an embodiment of the power management circuit depicted in FIG. 1 that is used with a wireless power source and a battery power source.
Figure 9:
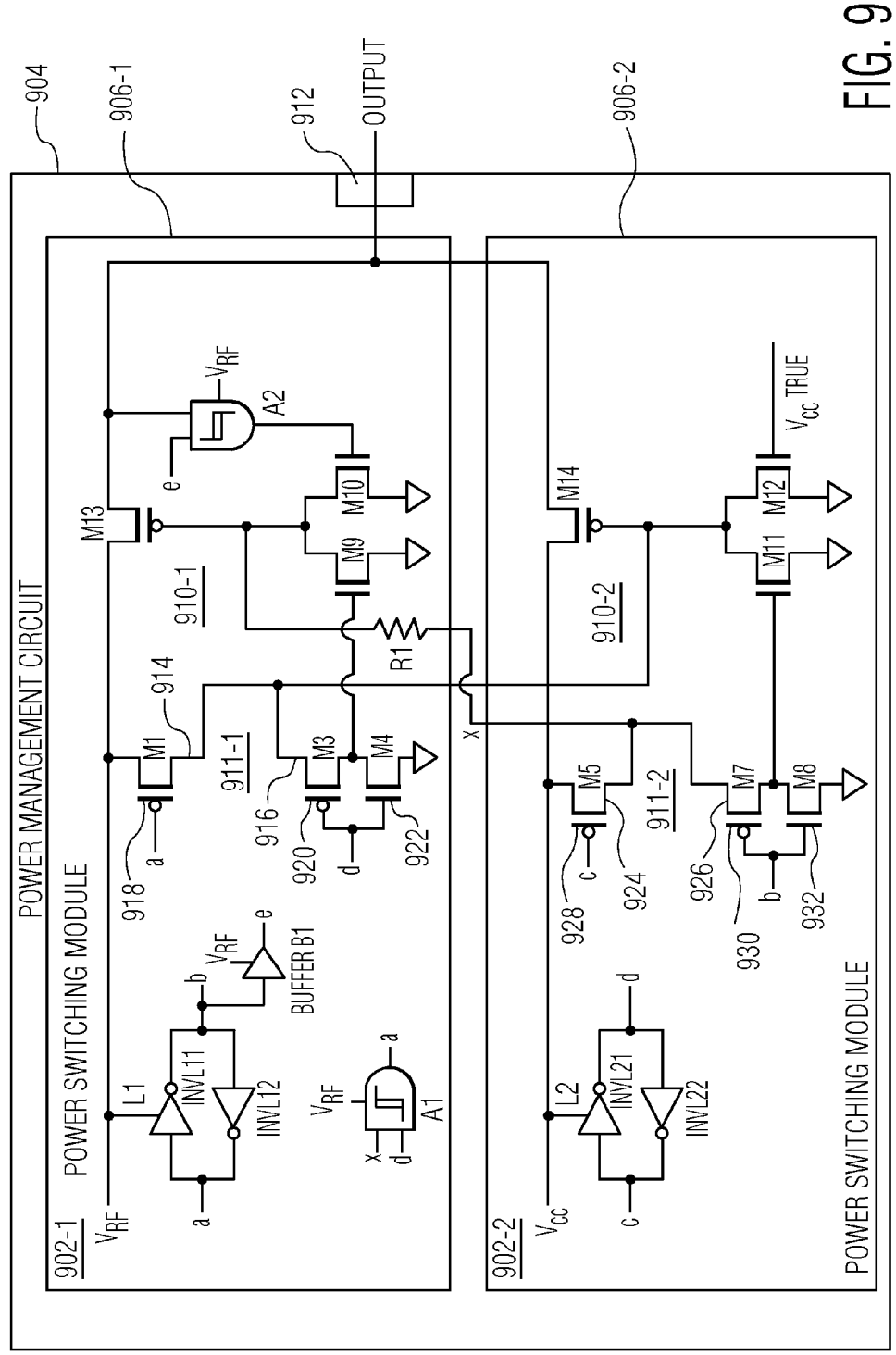
FIG. 9 depicts another embodiment of the power management circuit depicted in FIG. 1 that is used with a wireless power source and a battery power source.

In some embodiments, the power management circuit 104 is used with a wireless power source and a battery power source. FIGS. 2 and 9 depict two embodiments of the power management circuit depicted in FIG. 1 that are used with a wireless RF electromagnetic power source and a battery power source.

FIG. 2 depicts a first embodiment of the power management circuit 104 depicted in FIG. 1 that is used with a wireless RF electromagnetic power source 202-1 and a battery power source 202-2. In the embodiment depicted in FIG. 2, a power management circuit 204 includes two power switching modules 206-1, 206-2. The power switching module 206-1 is supplied by the wireless power source with a voltage, "$V_{RF}$." In some embodiments, the power management circuit includes an inducer that can be charged wirelessly by electromagnetic signals from the wireless power source. The power switching module 206-2 is supplied by the battery power source with a voltage, "$V_{CC}$".

The power switching module 206-1 includes a latch circuit, "L1," configured to have a definite state at power-up of the wireless power source 202-1 and a logic circuit 210-1 configured to prevent cross conduction between the wireless power source and the battery power source 202-2 and to connect/disconnect the wireless power source to/from an output terminal 212 of the power management circuit 204. In the embodiment depicted in FIG. 2, the latch circuit, "L1," is a back to back inverter latch circuit that includes two inverters, "INVL11," "INVL12," which are connected back to back. The back to back inverter latch circuit has a dynamic switching point threshold that scales well with the voltage level, "$V_{RF}$," of the wireless power source and allows the back to back inverter to have a defined state at power-up of the wireless power source with a good noise margin. In some embodiments, the latch circuit is overridden by a driver circuit (e.g., an AND gate, "A1") to flip the state based on a power-up preference setting to override the logic when multiple power sources are available. The driver circuit may be applied only to the power switching module that does not have the precedence. In the embodiment depicted in FIG. 2, the Vrf does not have the precedence. The logic circuit includes a cross-coupled circuit 211-1, which includes four transistors, "M1," "M2," "M3," "M4," a power switch that is implemented as a p-channel metal-oxide-semiconductor field effect transistor (PMOS) transistor, "M13," AND gates, "A1," "A2," a buffer circuit, "B1," transistors, "M9," "M10," and a resistor, "R1." A node, "N1," between the PMOS transistor, "M1," and the NMOS transistor, "M2," is connected to a terminal 214 (e.g., a drain terminal or a source terminal) of the PMOS transistor, "M3." A node, "N2," between the PMOS transistor, "M3," and the NMOS transistor, "M4," is connected to a terminal 216 (e.g., a drain terminal or a source terminal) of the NMOS transistor, "M2." Gate terminals 218, 220 of the PMOS transistor, "M1," and the NMOS transistor, "M2," are connected to a terminal, "a," of the latch circuit, "L1." Gate terminals 222, 224 of the PMOS transistor, "M3," and the NMOS transistor, "M4," are connected to a terminal, "d," of a latch circuit, "L2," of the power switching module 206-2. The cross-coupled circuit 211-1 allows a break before a make operation to inhibit or prevent a current path between the RF electromagnetic voltage, "$V_{RF}$," and the battery voltage, "$V_{CC}$." In an embodiment, the cross-coupled circuit 211-1 ensures that the switch, "M14," is switched off before the switch, "M13," is turned ON.

The power switching module 206-2 includes the latch circuit, "L2," configured to have a definite state at power-up of the battery power source and a logic circuit 210-2 configured to prevent cross conduction between the wireless power source 202-1 and the battery power source 202-2 and to connect/disconnect the battery power source to/from the output terminal 212 of the power management circuit 204. In the embodiment depicted in FIG. 2, the latch circuit, "L2," is a back to back inverter latch circuit that includes two inverters, "INVL21," "INVL22," which are connected back to back. The back to back inverter latch circuit has a dynamic switching point threshold that scales well with the voltage level of the battery power source and allows the back to back inverter to have a defined state at power-up of the battery power source with a good noise margin. In some embodiments, the latch circuit is overridden by a driver circuit to flip the state based on a power-up preference setting. The logic circuit includes a cross-coupled circuit 211-2, which includes four transistors, "M5," "M6," "M7," "M8," a power switch that is implemented as a PMOS transistor, "M14," and transistors, "M11," "M12." A node, "N3," between the PMOS transistor, "M5," and the NMOS transistor, "M6," is connected to a terminal 226 (e.g., a drain terminal or a source terminal) of the PMOS transistor, "M7." A node, "N4," between the PMOS transistor, "M7," and the NMOS transistor, "M8," is connected to a terminal 228 (e.g., a drain terminal or a source terminal) of the NMOS transistor, "M6." Gate terminals 230, 232 of the PMOS transistor, "M5," and the NMOS transistor, "M6," are connected to a terminal, "c," of the latch circuit, "L2." Gate terminals 234, 236 of the PMOS transistor, "M7," and the NMOS transistor, "M8," are connected to a terminal, "b," of the latch circuit, "L1," of the power switching module 206-1. The cross-coupled circuit 211-2 allows a break before a make operation to inhibit or prevent a current path between the battery voltage, "$V_{CC}$," and the RF electromagnetic voltage, "$V_{RF}$." In an embodiment, the cross-coupled circuit 211-2 ensures that the switch, "M13," is switched off before the switch, "M14," is turned ON.

In the embodiment depicted in FIG. 2, the latch circuits "L1," "L2" of the power management circuit 204 have a definite state at power-up of the wireless power source 202-1 and the battery power source 202-2, respectively, which allows the power management circuit to work with various power-up sequences of the power sources. In an embodiment, the sizes of the inverters, "INVL11," "INVL12," "INVL21," "INVL22," are chosen such that terminal/node, "a," terminal/node, "b," is low and high, respectively, during a power-up of the wireless power source, while terminal/node, "c," terminal/node, "d," is low and high, respectively, during a power-up of the battery power source. A driver circuit, such as a flip circuit, can override the state of the latch circuits.

Figure 3A:
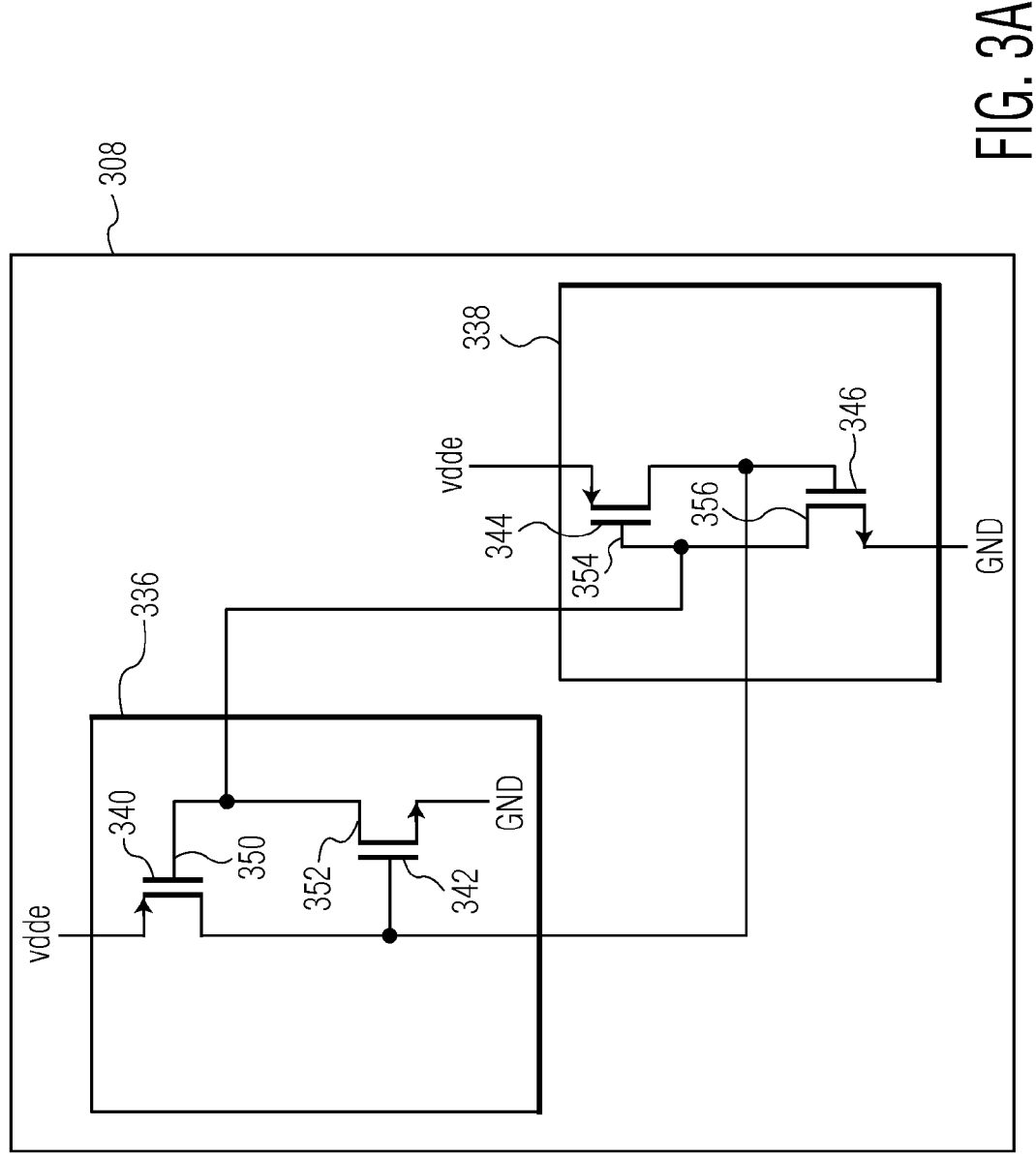
FIG. 3A depicts an embodiment of one of the latch circuits depicted in FIG. 2.
Figure 3B:
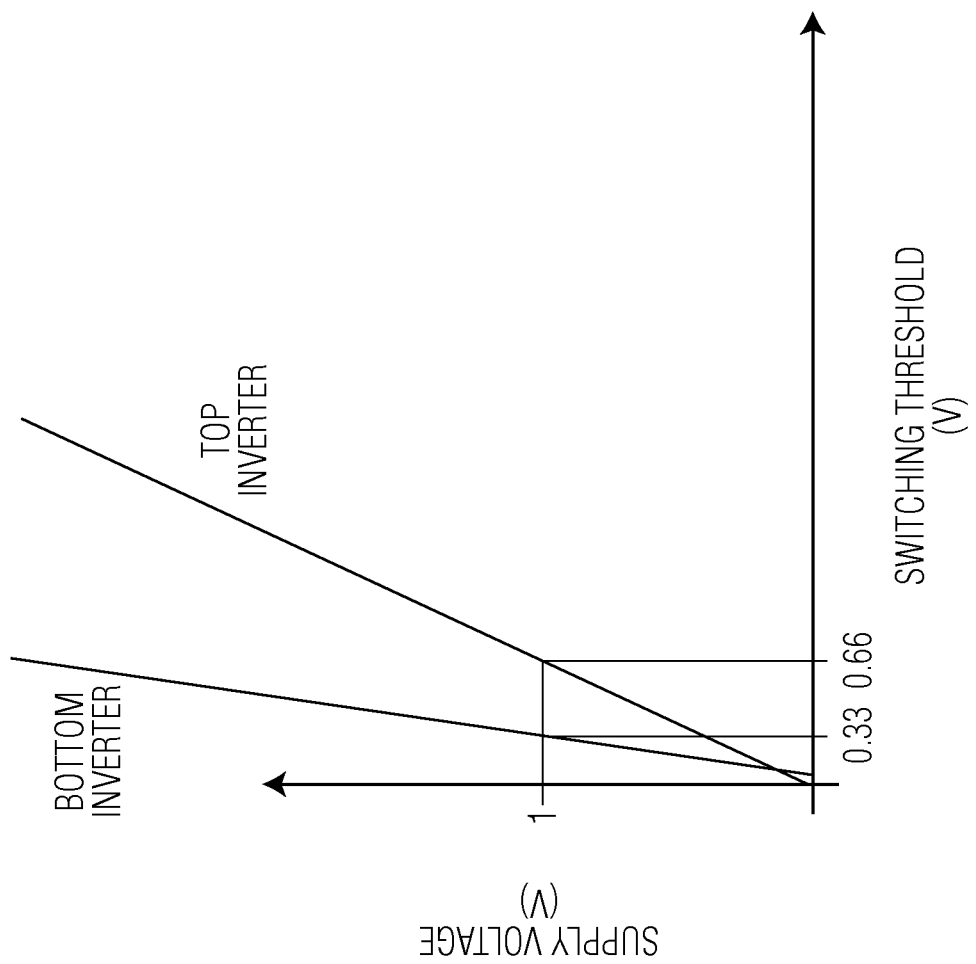
FIG. 3B depicts a switching point threshold diagram of the latch circuit depicted in FIG. 3A.

FIG. 3A depicts an embodiment of the latch circuit, "L1" or "L2," depicted in FIG. 2. In the embodiment depicted in FIG. 3A, a latch circuit 308 includes two inverters 336, 338 that are connected back-to-back to form a latch configuration. The top inverter 336 includes a PMOS transistor 340 and an NMOS transistor 342. The gate terminal 350 of the PMOS transistor 340 is connected to the drain terminal 352 of the NMOS transistor 342. The bottom inverter 338 includes a PMOS transistor 344 and an NMOS transistor 346. The gate terminal 354 of the PMOS transistor 344 is connected to the drain terminal 356 of the NMOS transistor 346. In some embodiments, the sizes of the inverters are chosen such that the PMOS transistor in one of the inverters is much stronger than the NMOS in the inverter while the reverse is true for the other inverter. The DC characteristics of such an arrangement allow the latch circuit 308 to go in a defined state at power up. Specifically, the output of an inverter with the stronger PMOS goes to a high state and the output of the inverter with the stronger NMOS transistor goes to a low state. FIG. 3B depicts a switching point threshold diagram of the latch circuit depicted in FIG. 3A. In one embodiment, the aspect ratio (P/N) of the top inverter 336 is larger than 4 and the aspect ratio (P/N) of the bottom inverter 338 is kept at 0.25. In this embodiment, the switching point of the top inverter is around 66% of the instantaneous supply voltage level and the switching point of the bottom inverter is kept at around 33% of the instantaneous supply voltage level. In one embodiment, the NMOS transistor is replaced by multiple NMOS transistors that are cascaded.

In an example of an operation of the latch circuit 308, outputs of both inverters 336, 338 are at a low state initially. As power starts ramping up, the PMOS transistors 340, 344 of both inverters are ON, which causes both inverter outputs to follow the power supply ramp up. The top inverter 336 starts to pull its output stronger than the bottom inverter 338 at the same time the bottom inverter 338 starts pulling its output low stronger than the inverter 336. As the top inverter 336 starts pulling its output high, the PMOS transistor of the bottom inverter 338 gets weaker and the NMOS transistor of the bottom inverter 338 gets stronger. Similarly as the bottom inverter is pulling its output low, the PMOS transistor of the top inverter is driven strongly and the NMOS transistor of the top inverter gets weaker. Therefore, both the inverters aid each other to get to the same steady stable state. By choosing the sizes of the inverters 336, 338, a stable state of the latch circuit can be achieved. In an embodiment, the sizes of the inverters 336, 338 are chosen such that the top inverter 336 pulls its output high above "the high switching point threshold" of the bottom inverter 338, driving its output to high while the bottom inverter 338 pulls its output low below the "low switching point threshold" of the top inverter 336, driving its output to low. In this embodiment, a stable state in which the output of the bottom inverter 336 is set to high can be achieved. Sizing the inverters in such a manner can maintain the noise margin of the circuit. For example, a dip or noise in the power supply due to switching can be a common mode signal to the two inverters 336, 338 and the switching point threshold of the inverters scale down with the power source, which provides good noise margin and allows a reliable steady state output for the latch circuit 308.

Turning to FIG. 2, the power management circuit 204 depicted in FIG. 2 requires no particular power-up sequence of the power sources 202-1, 202-2 to be followed. For example, the power management circuit can work with a power-up sequence where the RF power source is present and the battery power source is absent, a power-up sequence where the battery power source is present and the RF power source is absent, a power-up sequence where the RF power source is present first and the battery power source is present later, a power-up sequence where the battery power source is present first and the RF power source is present later, and a power-up sequence where the battery power source and the RF power source are present simultaneously. FIGS. 4-8 depict signal diagrams of the power management circuit under 5 different power-up sequences.

FIG. 4 depicts a signal diagram of the power management circuit depicted in FIG. 2 in a power-up sequence where the RF power source 202-1 comes up and the battery power source 202-2 is absent. As shown in FIG. 4, the wireless power source with a voltage, "$V_{RF}$," is applied to the power management circuit 204 while the battery power source with a voltage, "$V_{CC}$," is turned OFF. When the voltage, "$V_{RF}$," of the wireless power source ramps up, the terminal/node, "a," of the latch circuit, "L1," is driven low and the terminal/node, "b," of the latch circuit, "L1," is driven high. The other latch circuit, "L2," which is connected to the voltage, "$V_{CC}$," drives both terminals/nodes, "c," "d," low because the battery power source is absent. Because the signal at the terminal, "a," is low, the gate of the $V_{CC}$ switch (i.e., the transistor, "M14,") is driven to high, which switches off the transistor, "M14." The gate of the transistor, "M9," is driven high through the transistors, "M1," "M3," which pulls down the gate of the $V_{RF}$ switch (i.e., the transistor, "M13,") and connects the wireless power source to the output of the power management circuit. During the power-up sequence, the power management circuit depicted in FIG. 2 ensures that the switch, "M14," is switched off before the switch, "M13," is turned ON, which prevents cross conduction between the power sources.

FIG. 5 depicts a signal diagram of the power management circuit 204 depicted in FIG. 2 in a power-up sequence where the battery power source comes up and the RF power source is absent. As shown in FIG. 5, the battery power source 202-2 with a voltage, "$V_{CC}$," is applied to the power management circuit while the wireless power source with a voltage, "$V_{RF}$," is turned OFF. When the voltage, "Vcc," of the battery power source ramps up, the terminal, "c," of the latch circuit, "L2," is driven low and the terminal, "d," of the latch circuit, "L2," is driven high. The other latch circuit, "L1," which is connected to the wireless voltage, drives both terminals, "a," and "b," low because the wireless power source is absent. Because the terminal, "c," of the latch circuit, "L2," is low, the gate of the $V_{RF}$ switch (i.e., the transistor, "M13,") is driven to high, which switches off the transistor, "M13." The gate of the transistor, "M11," is driven high through the transistors, "M5" and "M7," which pulls down the gate of the $V_{CC}$ switch (i.e., the transistor, "M14,") and connects the battery power source to the output of the power management circuit. During the power-up sequence, the power management circuit depicted in FIG. 2 ensures that the transistor, "M13," is switched off before the transistor, "M14" is turned ON, which prevents cross conduction between the power sources.

Figure 6:
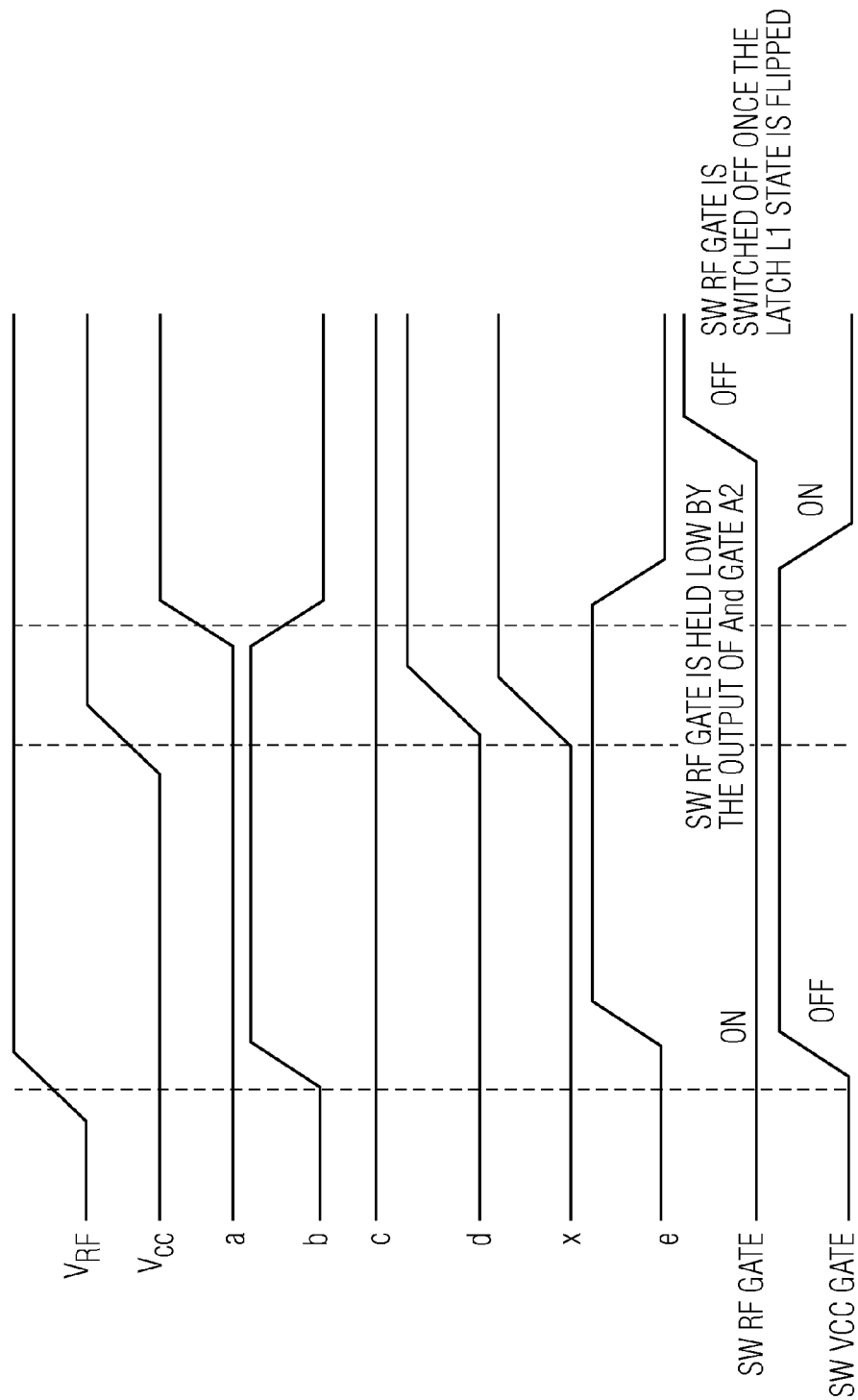
FIG. 6 depicts a signal diagram of the power management circuit depicted in FIG. 2 in a power-up sequence where the wireless power source is present first and the battery power source is present later.

FIG. 6 depicts a signal diagram of the power management circuit 204 depicted in FIG. 2 in a power-up sequence where the RF power source 202-1 comes up first and the battery power source 202-2 comes up later. As shown in FIG. 6, the wireless power source with a voltage, "$V_{RF}$," is present first and the battery power source with a voltage, "$V_{CC}$," is present later. When the voltage $V_{RF}$ of the wireless power source ramps up, the terminal, "a," of the latch circuit, "L1," is driven low and the terminal, "b," of the latch circuit, "L1," is driven high. Because the battery power source is absent, the terminals, "c," and "d," of the latch circuit, "L2," both are driven low and the wireless power source is connected to the output of the power management circuit. The terminal/node, "e," of the buffer circuit, "B1," is also driven high after a delay time of the buffer circuit, which switches ON the NMOS transistor, "M10," connected between the gate terminal of the switch, "M13," and ground.

When the battery power source 202-2 comes up, the terminal, "c," of the latch circuit, "L2," is driven low while the terminal, "d," of the latch circuit, "L2," is driven high. The $V_{CC}$ switch (i.e., the transistor, "M14,") is turned ON because the terminal, "c," of the latch circuit, "L2," is driven low. At the same time, because the terminal, "d," of the latch circuit, "L2," is driven high, it attempts to switch OFF the transistor, "M13." However, due to the parallel transistor, "M10," holding the gate of the transistor "M13" low, the $V_{RF}$ switch (i.e., the transistor, "M13,") remains ON, causing no interruption in the output source. The switching ON of the $V_{CC}$ switch (i.e., the transistor, "M14,") can be delayed if required by using a RC circuit or a logic signal derived from a voltage level detector to make sure that the voltage, "$V_{CC}$," of battery power source is high enough before connection to avoid current going from the RF power source 202-1 to the battery power source 202-2 and dip in output of the power management circuit 204.

Once the $V_{CC}$ switch (i.e., the transistor, "M14,") is turned ON, the And gate (A1) output driven by inputs at terminals, "x," and "d," goes high, which flips the default state of the latch, "L1," connected to the wireless power source 202-1. In this case, the terminal, "a," of the latch circuit, "L1," is driven high and the terminal, "b," of the latch circuit, "L1," is driven low, which switches off the transistor, "M13," and keeps the transistor, "M14," ON, connecting the battery power source 202-2 to the output. During the transition from the wireless power source 202-1 to the battery power source 202-2, there is a short circuit path between the battery power source and ground through the transistors, "M5" and "M10." The short circuit path is a momentary phenomenon and the path is disconnected as soon as the And gate (A1) flips the state of the latch circuit, "L1," and the terminal, "e," of the latch circuit, "L1," is driven low. To limit the current during this transition, a high value resistor, "R1," is used in the path between the power switching modules 206-1, 206-2 of the power management circuit 204. In an embodiment, the resistance of the resistor, "R1," is chosen such that the RC time constant to switch ON the switch, "M13," falls within a predefined threshold.

Figure 7:
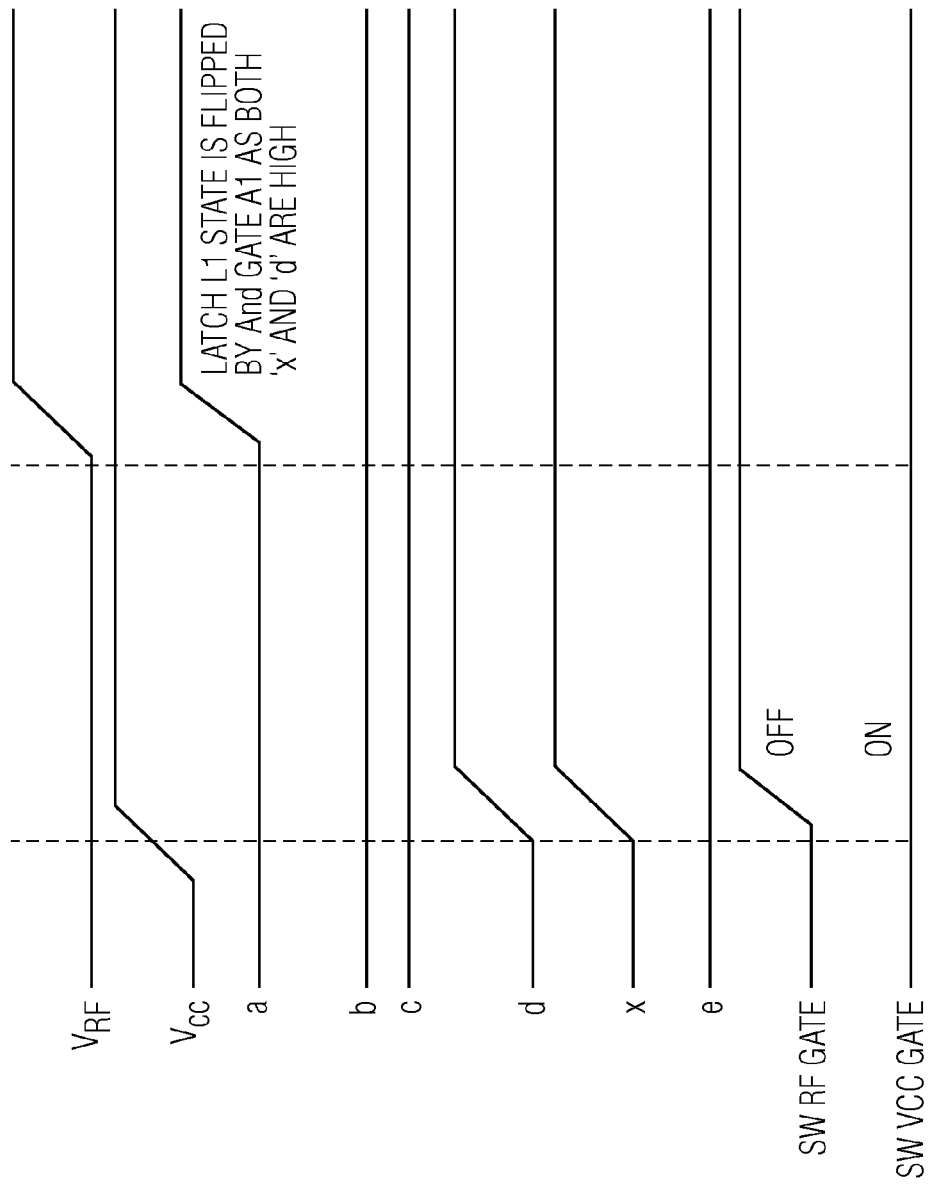
FIG. 7 depicts a signal diagram of the power management circuit depicted in FIG. 2 in a power-up sequence where the battery power source is present first and the wireless power source is present later.

FIG. 7 depicts a signal diagram of the power management circuit 204 depicted in FIG. 2 in a power-up sequence where the battery power source 202-2 comes up first and the RF power source 202-1 comes up later. As shown in FIG. 7, the battery power source with a voltage, "$V_{CC}$," is present first and the wireless power source with a voltage, "$V_{RF}$," is present later. When the voltage, "Vcc," of the battery power source ramps up, the terminal, "c," of the latch circuit, "L2," is driven low and the terminal, "d," of the latch circuit, "L2," is driven high, while the terminals, "a," and "b," of the latch circuit, "L1," both are driven low, which turns ON the transistor, "M14." Both the input terminals, "x," and "d," of the And gate, "A1," are driven high. However, because the wireless power source is not present, the output of the And gate, "A1," is still low. When the wireless power source comes up, the And gate, "A1," output is driven high. The high state at the output terminal, "a," of the And gate, "A1," flips the default state of the latch, "L1," to keep the $V_{CC}$ switch (i.e., the transistor, "M14,") ON and the $V_{RF}$ switch (i.e., the transistor, "M13,") remains in an OFF condition, causing the required power source (in this case the battery) to be connected to the output terminal 212 of the power management circuit 204.

Figure 8:
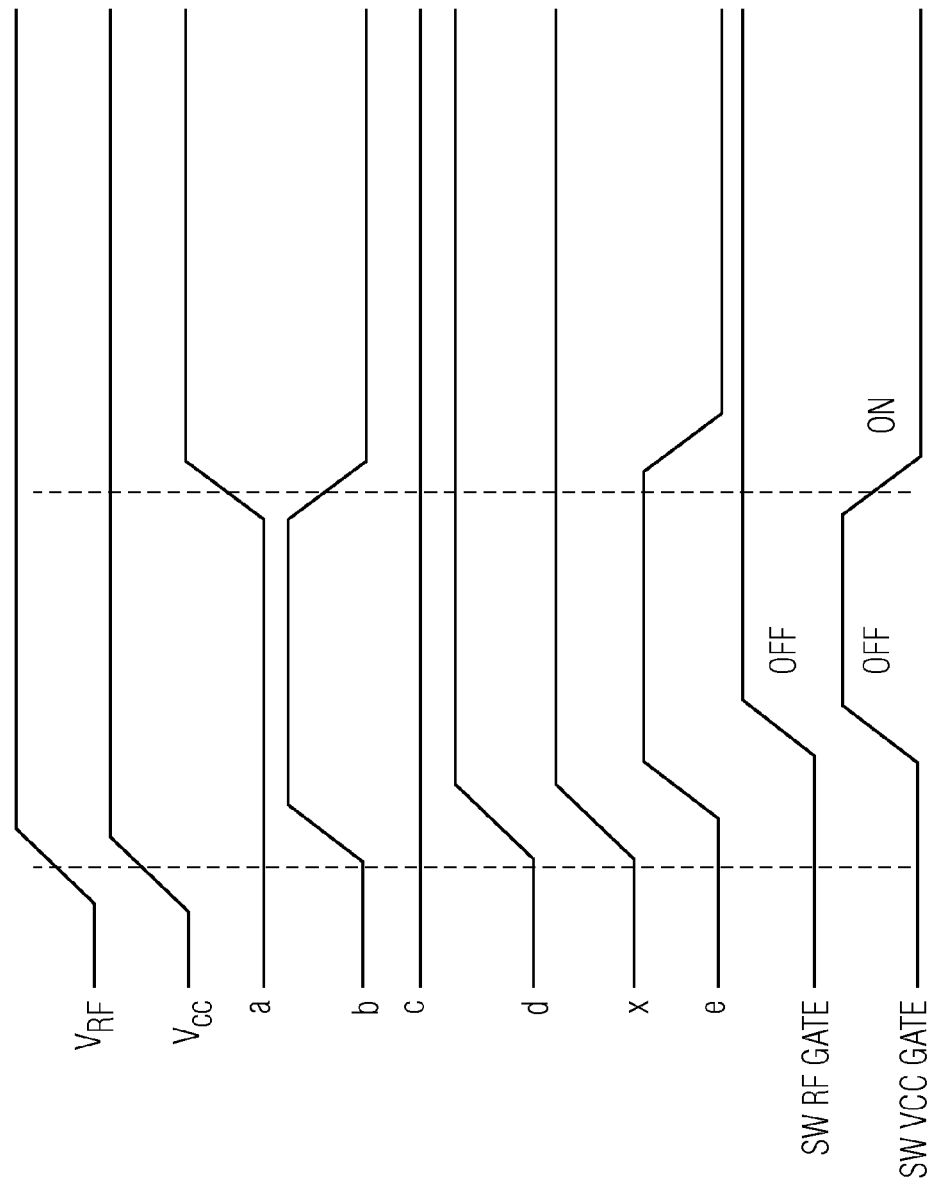
FIG. 8 depicts a signal diagram of the power management circuit depicted in FIG. 2 in a power-up sequence where the battery power source and the wireless power source are present simultaneously.

FIG. 8 depicts a signal diagram of the power management circuit 204 depicted in FIG. 2 in a power-up sequence where the battery power source 202-2 and the RF power source 202-1 come up simultaneously. As shown in FIG. 8, the battery power source with a voltage, "$V_{CC}$," and the wireless power source with a voltage, "$V_{RF}$," are present at the same time. When both the battery power source and the wireless power source ramps up at the same time, the terminals, "a," and, "c," of the latch circuits, "L1," "L2," are driven low, the terminals, "b," and "d," of the latch circuits, "L1," "L2," are driven high. Gates of both the switches, "M13," and "M14," are driven high and the switches, "M13," and "M14," are switched OFF. Once both the input terminals, "x," and "d," of the And gate, "A1," are driven high, the And gate, "A1," flips the state of the latch, "L1," which turns the gate of the transistor, "M11," high. The high state of the transistor, "M11," pulls down the gate of the transistor, "M14," which turns ON the transistor, "M14," and connecting the battery power source to the output of the power management circuit. The $V_{RF}$ switch (i.e., the transistor, "M13,") remains OFF. Although the signal at the terminal, "e," goes up initially after the terminal, "b," of the latch circuit, "L1," is driven high, the gate of the transistor, "M10," is driven low because the output source is still not ramped up and the output of And gate, "A2," remains low. As shown in the waveform, both switches, "M13," and "M14," are OFF initially, and then the battery power source is applied to the output of the power management circuit 204, while the $V_{RF}$ switch (i.e., the transistor, "M13,") remains in switched OFF condition. In one embodiment, the the power management circuit 204 is implemented in an electronic device that is connected to AC power and the battery power source 202-2 is a chargeable battery that is charged by the mains voltage via a rectifier and charger circuit.

FIG. 9 depicts a second embodiment of the power management circuit 104 depicted in FIG. 1 that is used with a wireless power source 902-1 and a battery power source 902-2. The wireless power source 902-1 and the battery power source 902-2 may be similar to or the same as the wireless power source 202-1 and the battery power source 202-2. The difference between the power management circuit 904 depicted in FIG. 9 and the power management circuit 204 depicted in FIG. 2 is that the power management circuit 904 depicted in FIG. 9 does not include transistors, "M2," "M6." In the embodiment depicted in FIG. 2, the transistors, "M2," "M6," are retained for symmetry and balance of load for the latch circuits, "L1," "L2." In the embodiment depicted in FIG. 9, the power management circuit 904 includes two power switching modules 906-1, 906-2. The power switching module 906-1 includes the latch circuit, "L1," configured to have a definite state at power-up of the wireless power source and a logic circuit 910-1 configured to prevent cross conduction between the wireless power source and the battery power source and to connect/disconnect the wireless power source to/from an output terminal 912 of the power management circuit 204. The logic circuit 910-1 includes a cross-coupled circuit 911-1, which includes three transistors, "M1," "M3," "M4," a power switch that is implemented as a PMOS transistor, "M13," AND gates, "A1," "A2," a buffer circuit, "B1," transistors, "M9," "M10," and a resistor, "R1." A terminal 914 (e.g., a drain terminal or a source terminal) of the PMOS transistor, "M1," is connected to a terminal 916 (e.g., a drain terminal or a source terminal) of the PMOS transistor, "M3." A gate terminal 918 of the PMOS transistor, "M1," is connected to a terminal, "a," of the latch circuit, "L1." Gate terminals 920, 922 of the PMOS transistor, "M3," and the NMOS transistor, "M4," are connected to the latch circuit, "L2," of the power switching module 906-2. The power switching module 906-2 includes the latch circuit, "L2," configured to have a definite state at power-up of the battery power source and a logic circuit 910-2 configured to prevent cross conduction between the wireless power source and the battery power source and to connect/disconnect the battery power source to/from the output terminal 912 of the power management circuit 204. The logic circuit 910-2 includes a cross-coupled circuit 911-2, which includes three transistors, "M5," "M7," "M8," a power switch that is implemented as a PMOS transistor, "M14," and transistors, "M11," "M12." A terminal 924 (e.g., a drain terminal or a source terminal) of the PMOS transistor, "M5," is connected to a terminal 926 (e.g., a drain terminal or a source terminal) of the PMOS transistor, "M7." A gate terminal 928 of the PMOS transistor, "M5," is connected to a terminal, "c," of the latch circuit, "L2." Gate terminals 930, 932 of the PMOS transistor, "M7," and the NMOS transistor, "M8," are connected to the terminal, "b," of the latch circuit, "L1," of the power switching module 906-1. The operation of the power management circuit 904 may be similar to or the same as the operation of the power management circuit 204.

Figure 10:
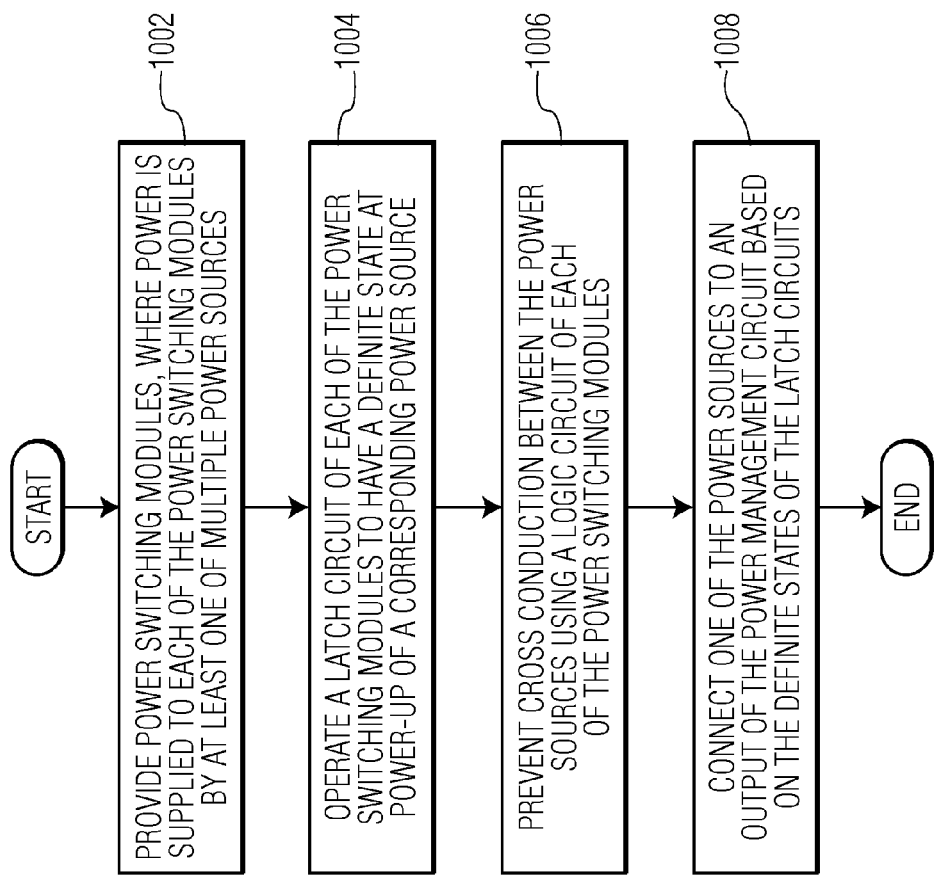
FIG. 10 is a process flow diagram of a method for operating a power management circuit in accordance with an embodiment of the invention.

FIG. 10 is a process flow diagram of a method for operating a power management circuit in accordance with an embodiment of the invention. The power management circuit may be similar to or the same as the power management circuit 104 depicted in FIG. 1, the power management circuit 204 depicted in FIG. 2, and/or the power management circuit 904 depicted in FIG. 9. At block 1002, power switching modules are provided, where power is supplied to each of the power switching modules by at least one of multiple power sources. At block 1004, a latch circuit of each of the power switching modules is operated to have a definite state at power-up of a corresponding power source. At block 1006, cross conduction between the power sources is prevented using a logic circuit of each of the power switching modules. At block 1008, one of the power sources is connected to an output of the power management circuit based on the definite states of the latch circuits.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A power management circuit comprising:
a plurality of power switching modules, wherein power is supplied to each of the power switching modules by at least one of a plurality of power sources, wherein each of the power switching modules comprises:
a latch circuit configured to have a definite state at power-up of a corresponding power source; and
a logic circuit configured to control power supplied from the corresponding power source in response to the definite state of the latch circuit, wherein the logic circuit comprises a cross-coupled circuit, wherein the logic circuit is configured to prevent cross conduction between the power sources, and wherein the cross-coupled circuit comprises a first PMOS transistor, a first NMOS transistor, a second PMOS transistor, and a second NMOS transistor, wherein a node between the first PMOS transistor and the first NMOS transistor is connected to a drain terminal or a source terminal of the second PMOS transistor, and wherein a node between the second PMOS transistor and the second NMOS transistor is connected to a drain terminal or a source terminal of the first NMOS transistor.

2. The power management circuit of claim 1, wherein the latch circuit of each of the power switching modules comprises a back-to-back inverter latch circuit, and wherein the back-to-back inverter latch circuit comprises two inverters that are connected back-to-back.

3. The power management circuit of claim 2, wherein each inverter comprises a PMOS transistor and an NMOS transistor, and wherein a gate terminal of the PMOS transistor is connected to a drain terminal of the NMOS transistor.

4. The power management circuit of claim 1, wherein within each of the power switching modules, gate terminals of the first PMOS transistor and the first NMOS transistor are connected to a terminal of the latch circuit, and wherein gate terminals of the second PMOS transistor and the second NMOS transistor are connected to a latch circuit of another power switching module.

5. The power management circuit of claim 1, wherein the logic circuit further comprises a switch circuit connected to the corresponding power source.

6. The power management circuit of claim 1, wherein the logic circuit is configured to connect the corresponding power source to an output terminal of the power management circuit or to disconnect the corresponding power source from the output terminal of the power management circuit.

7. The power management circuit of claim 1, wherein the plurality of power sources comprises a battery power source or a wireless power source.

8. The power management circuit of claim 1, wherein the plurality of power sources comprises a wireless power source and a battery power source.

9. An integrated circuit (IC) comprising:
the power management circuit of claim 1; and
a battery power source.

10. A power management circuit comprising:
a first power switching module, wherein power is supplied to the first power switching module by a wireless power source;
a second power switching module, wherein power is supplied to the second power switching module by a battery power source, wherein each of the first and second power switching modules comprises:
a back-to-back inverter latch circuit configured to have a definite state at power-up of a corresponding power source; and
a logic circuit configured to control power supplied from the corresponding power source in response to the definite state of the back-to-back inverter latch circuit, wherein the logic circuit is configured to prevent cross conduction between the wireless power source and the battery power source, and wherein the logic circuit comprises:
a cross-coupled circuit; and
a switch circuit connected to the corresponding power source;
wherein the back-to-back inverter latch circuit of each of the first and second power switching modules comprises two inverters that are connected back-to-back, wherein each inverter comprises a PMOS transistor and an NMOS transistor, and wherein a gate terminal of the PMOS transistor is connected to a drain terminal of the NMOS transistor;
wherein the cross-coupled circuit comprises a first PMOS transistor, a first NMOS transistor, a second PMOS transistor, and a second NMOS transistor, wherein a node between the first PMOS transistor and the first NMOS transistor is connected to a drain terminal or a source terminal of the second PMOS transistor, wherein a node between the second PMOS transistor and the second NMOS transistor is connected to a drain terminal or a source terminal of the first NMOS transistor, wherein within each of the first and second power switching modules, gate terminals of the first PMOS transistor and the first NMOS transistor are connected to a terminal of the latch circuit, and wherein gate terminals of the second PMOS transistor and the second NMOS transistor are connected to a latch circuit of another power switching module.

11. An integrated circuit (IC) comprising:
the power management circuit of claim 10; and
the battery power source.

12. A power management circuit comprising:
a plurality of power switching modules, wherein power is supplied to each of the power switching modules by at least one of a plurality of power sources, wherein each of the power switching modules comprises:
a latch circuit configured to have a definite state at power-up of a corresponding power source; and
a logic circuit configured to control power supplied from the corresponding power source in response to the definite state of the latch circuit, wherein the logic circuit comprises a cross-coupled circuit, wherein the logic circuit is configured to prevent cross conduction between the power sources;
wherein the cross-coupled circuit comprises a first PMOS transistor, a second PMOS transistor, and an NMOS transistor, and wherein a source terminal or a drain terminal of the first PMOS transistor is connected to a drain terminal or a source terminal of the second PMOS transistor;
wherein within each of the power switching modules, a gate terminal of the first PMOS transistor is connected to a terminal of the latch circuit, and wherein gate terminals of the second PMOS transistor and the NMOS transistor are connected to a latch circuit of another power switching module.

13. The power management circuit of claim 12, wherein the latch circuit of each of the power switching modules comprises a back-to-back inverter latch circuit, and wherein the back-to-back inverter latch circuit comprises two inverters that are connected back-to-back.

14. The power management circuit of claim 13, wherein each inverter comprises a PMOS transistor and an NMOS transistor, and wherein a gate terminal of the PMOS transistor is connected to a drain terminal of the NMOS transistor.

15. The power management circuit of claim 12, wherein the plurality of power sources comprises a battery power source or a wireless power source.

16. The power management circuit of claim 12, wherein the plurality of power sources comprises a wireless power source and a battery power source.

17. An integrated circuit (IC) comprising:
the power management circuit of claim 12; and
a battery power source.

* * * * *